United States Patent [19]

Richard

[11] Patent Number: 5,071,238
[45] Date of Patent: Dec. 10, 1991

[54] TELESCOPIC CAMERA

[75] Inventor: David A. Richard, San Diemas, Calif.

[73] Assignee: Joel Ltd., West Springfield, Mass.

[21] Appl. No.: 433,619

[22] Filed: Nov. 8, 1989

[51] Int. Cl.$^5$ .......................... B29D 11/00; G02B 9/14
[52] U.S. Cl. ...................................... 359/708; 359/785
[58] Field of Search ................................ 350/475, 432

[56] References Cited

U.S. PATENT DOCUMENTS 4,105,308  8/1978  Owen, Jr. et al. .................. 350/432

Primary Examiner—Bruce Y. Arnold
Assistant Examiner—Rebecca D. Gass
Attorney, Agent, or Firm—Paul G. Lunn

[57] ABSTRACT

Disclosed is a lens system for a telescopic camera comprised of a primary lens, a secondary lens and a tertiary lens. The primary lens is a positive lens having a convex front surface and an aspheric back surface which define an optical axis. The secondary lens is a negative lens which has a concave front surface and a concave back. The front surface of the secondary lens is positioned at a predetermined fixed distance adjacent to the back surface of the primary lens and centered with respect to the optical axis. The tertiary lens is a field flattening lens having a convex front surface and a convex back surface. The front surface of the tertiary lens is positioned at a predetermined fixed distance adjacent to the back surface of the secondary lens, wherein the primary, secondary and tertiary lenses have surfaces shaped to focus on an object viewed such that a field of view of about 4.2° is produced, and said lens system is capable of capturing approximately 94% of all incident photons within the optical axis.

10 Claims, 5 Drawing Sheets

TELESCOPIC CAMERA

FIELD OF THE INVENTION

The present invention lies in the field of the telescopic cameras.

BACKGROUND OF THE INVENTION

The present invention is a telescopic camera. Telescopic cameras and telephoto lenses are well known. These types of devices are able to capture on film distant objects and have them appear as though they were very close. However, telescopic cameras of the prior art have been unable to focus the background and periphery of the picture when the subject of the picture is in focus due to the limited field of view these telephoto lens systems have, which is generally only about 0.75°. The lenses in the prior telescopic cameras have a resolution of only about 45 line pairs/mm, have chromatic aberrations and the film only resolves about 30 to 35 line pairs.

SUMMARY OF THE INVENTION

Accordingly, it is an object of the present invention to overcome the disadvantages of the above-described prior art telescopic cameras.

It is an object of the present invention to produce a richest field telescopic camera having a field of view of about 4.2°.

It is another object of the present invention to produce a lens system for a telescopic camera which is a diffraction limited system of extreme efficiency capable of capturing approximately 94% of all incident photons.

It is a further object of the present invention to produce a telescopic camera in which all of the wavelengths of the image produced on film are at a common focus, that is the image is achromatic.

The present invention is a telescopic camera. The telescopic camera has a telescopic lens system and a camera attached to the telescopic lens system. The camera has an annular tube permanently fixed to a camera. Within the annular tube are three permanently focused lenses. The annular tube is comprised of material having a rigid construction and makeup to maintain a fixed lens relationship. The inner surface of the tube has a surface finish so as to prevent secondary internal reflections. Preferably, the annular tube is comprised of a fiber glass filled acrylonitrile butadiene styrene (ABS) composite.

The lens system for the telescopic camera of the present invention includes a primary lens defining an optical axis. The primary lens is positive and comprised of plastic. The primary lens is both achromatic and polychromatic. The front surface of the primary lens is convex and the back surface is aspheric. The aspheric back surface greatly reduces any spherical aberration to insignificance, in which case the system is said to be achromatic.

Adjacent to the primary lens is a secondary lens which is negative and is comprised of plastic.

Adjacent to the secondary lens and the aperture of the camera is a field flattening lens. Both the secondary lens and the field flattening lens are centered with respect to the optical axis.

Preferably, the primary objective lens is comprised of polymethylmerthacrylate and the second biconcave lens of the air-gap achromat is comprised of nitroacrylate styrene. In a preferred embodiment, the viewfinder is a 20 mm vocal length Ramsden wide angle eyepiece with a ±2 diopter accommodation which extends from and through the annular tube. A first surface reflecting mirror lies between the field flattening lens and the camera shutter so that one can view the object being photographed through the 3 element lens system and eyepiece lens.

The resultant lens system creates a diffraction limited system having extreme efficiency in which about 94% of all incident photons are retained; the field of view is approximately 4.2°; the telescopic camera system resolves up to 180 line pairs/mm; and the image which is produced is achromatic, i.e. all wavelengths of light are at a common point of focus. All points within a photograph taken by the telescopic camera are in focus as is shown in the Modulation Transmission Frequency (MTF) in FIG. 3.

These together with other objects and advantages which will become subsequently apparent reside in the details of construction and operation is more fully hereinafter described and claimed, reference being had to the accompanying drawings forming a part hereof, wherein like numerals refer to like parts throughout.

DETAILED DESCRIPTION OF THE INVENTION

Figure 1:
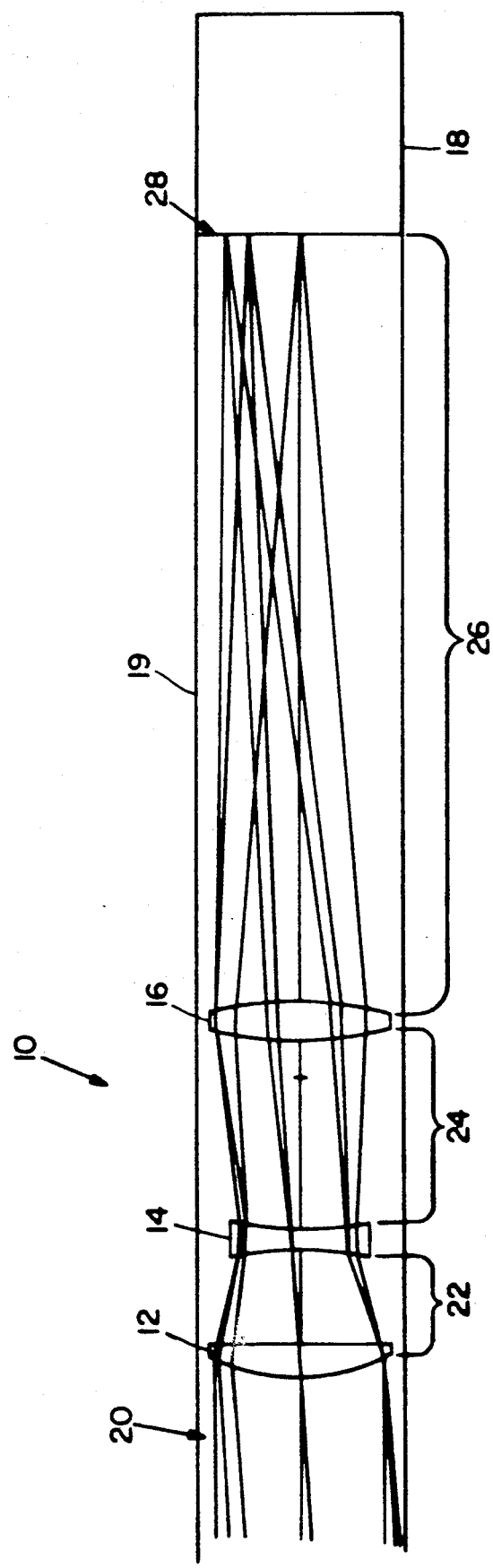
FIG. 1 illustrates a three element lens system and an optic path of an embodiment of the telescopic camera of the present invention.

FIG. 1 illustrates an embodiment of the lens system of the telescopic camera of the present invention. The lens system 10 includes a primary lens 12 which is a positive lens made of polymethylmerthacrylate. Primary lens 12 is positioned at a specific distance adjacent to a secondary lens 14 which is negative and is made of nitroacrylate styrene thus forming the achromatic system. Secondary lens 14 is positioned adjacent to a tertiary field flattening lens 16 which in turn stands adjacent to the shutter (not shown) of a camera 18. The lenses are encased in an annular tube 19 having the aforementioned criteria, the primary lens 12 being located towards the front of the tube and the camera 18 being attached to the end of tube 19.

Primary lens 12 defines an optical axis 20 which runs through the vertex of lens 12. Primary lens 12 has a convex front surface and an aspheric back surface. Primary lens 12 has a predetermined radius of curvature on the convex front side. The aspheric side has a predetermined asphere. Also primary lens 12 has a predetermined thickness at the vertex and predetermined aperture diameters on the convex front and the aspheric back surfaces.

The secondary lens 14 is centered with respect to optical axis 20. The secondary lens 14 is a biconcave lens, has a predetermined radius of curvature on the concave front surface of the lens and a predetermined radius of curvature on the concave back surface of the lens. The secondary lens 14 has a predetermined thickness at its vertex and predetermined aperture diameters on the concave front and concave back surfaces.

The tertiary lens 16 is centered with respect to optical axis 20. The tertiary lens has a convex front surface and a convex back surface. Tertiary lens 16 has a predetermined radius of curvature on the convex front surface and a predetermined radius of curvature on the convex back surface. Tertiary lens 16 has a predetermined thickness at its vertex and predetermined aperture diameters on the convex front and convex back surfaces.

Primary lens 12 is positioned so that the back surface of lens 12 is at a predetermined distance 22 from the front surface of secondary lens 14. The back surface of secondary lens 14 is at a predetermined distance 24 from the front surface of tertiary lens 16. Likewise, the back surface of tertiary lens 16 is at a predetermined distance 26 from film 28 contained within camera.

Figure 2:
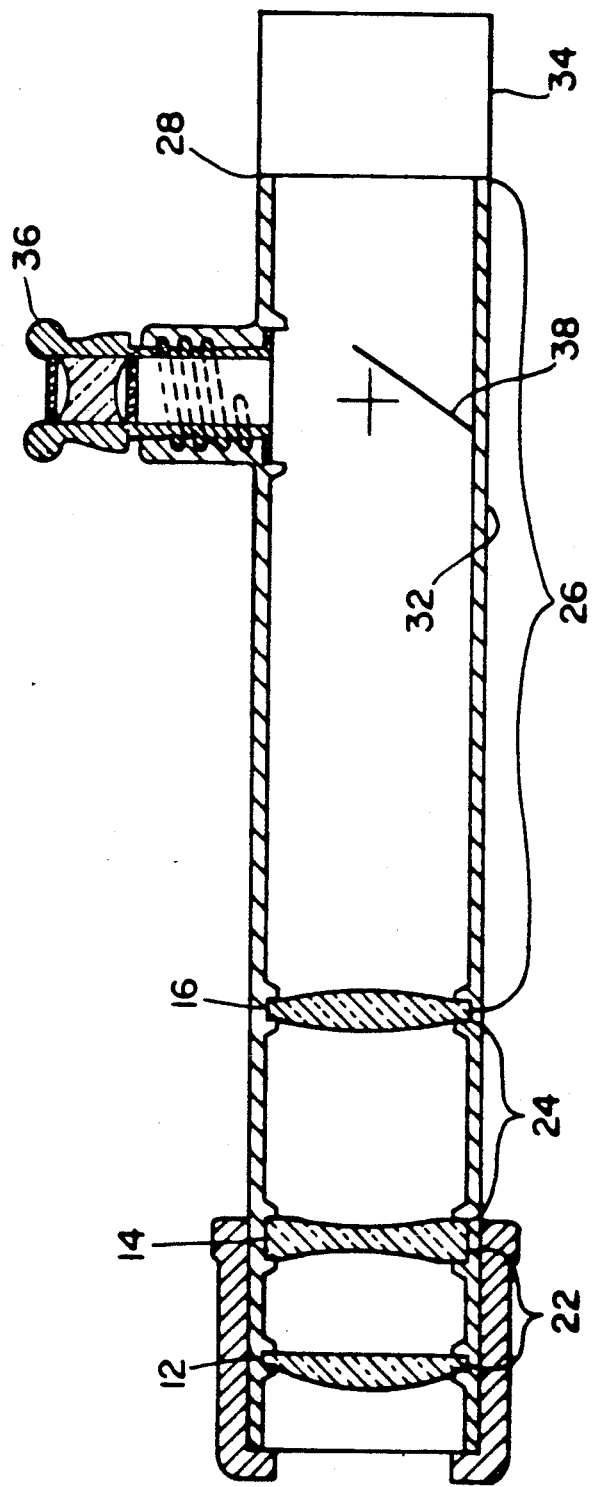
FIG. 2 shows a longitudinal cross-section of a preferred embodiment of the telescopic camera of the present invention.
Figure 3:
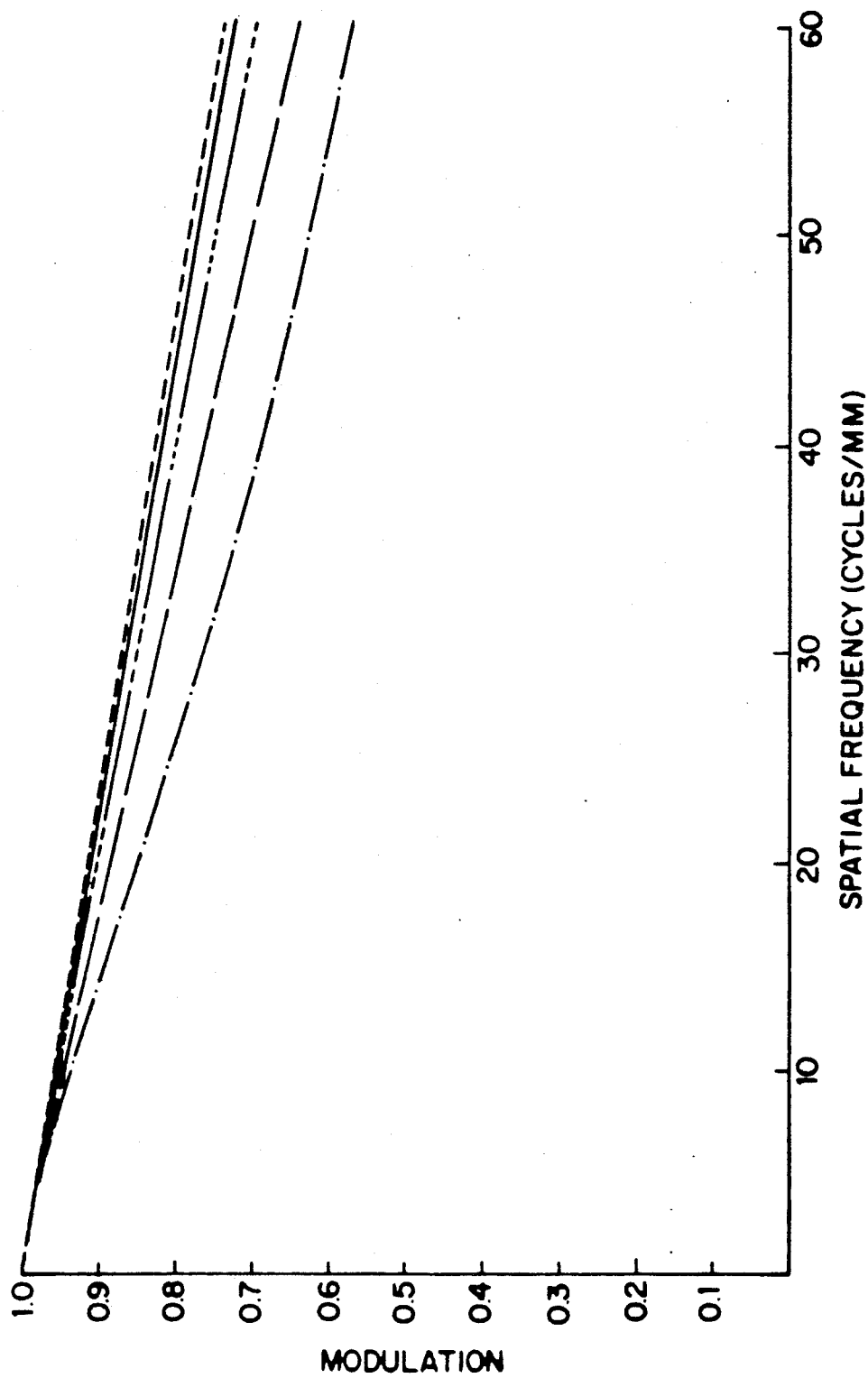
FIG. 3 is a Diffraction Modulation Transmission Frequency (MTF) Plot of a preferred embodiment of the present invention.

FIG. 2 shows a longitudinal cross-section of a preferred embodiment 30 of the telescopic camera of the present invention. Telescopic camera 30 is comprised of an annular tube 32 which is comprised of a fiber glass filled ABS composite and has an internal diameter of 50 mm. Locked within annular tube 32 are three prefocused lenses, namely, the front telephoto objective lens 12, the middle biconcave lens 14, and the field flattening lens 16. The lens design is an air-spaced, aspheric achromat and field flattening lens system. At the end of the tube is attached a camera 34 which is in this case is a 35 mm reflex camera.

The viewfinder 36 is a Ramsden wide angle eyepiece with a ±2 diopter accommodation which extends into annular tube 32 in between field flattening lens 16 and camera 34. A reflecting mirror 38 is positioned within annular tube 32 reflecting the beam of light which travels through the tube into the eyepiece so that an operator of the telescopic camera can view the image as it will appear on film. The specifications for a preferred embodiment of the lens system of the preferred embodiment of the present invention are given below.

PRIMARY LENS 12

Radius of Curvature of the front surface is 56.5695 mm convex.
Radius of Curvature of the back surface is an Asphere.
The Center Thickness is 10 mm.
Thickness at the Periphery is 3.15 mm.
The Aperture Diameter of the front surface is 50.0000 mm.
The Aperture Diameter of the back surface is 48.8705 mm.
Distance 22 between the back of primary lens 12 and the front of secondary lens 14 is 27.1157 mm.
The Index of Refraction is 1.489 at 656.5 nanometer (nm), 1.491 at 589.3 nm and 1.497 at 486.1 nm.

SECONDARY LENS 14

Radius of Curvature of the front surface is −91.3488 mm concave.
Radius of Curvature of the back surface is 52.0513 mm concave.
The Center Thickness is 6 mm.
Thickness at the Periphery is 11.70.
The Aperture Diameter of the front surface is 38.3664 mm.
The Aperture Diameter of the back surface is 37.5159 mm.
Distance 24 between the back of secondary lens 14 and the front of field flattening lens 16 is 56.6885 mm.
The Index of Refraction is 1.558 at 656.5 nm, 1.562 at 589.3 nm and 1.574 at 486.1 nm

FIELD FLATTENING LENS 16

Radius of Curvature of the front surface is 206.0846 mm convex.
Radius of Curvature of the back surface is −115.6613 mm convex.
The Center Thickness is 10 mm.
Thickness at the Periphery is 2.38 mm.
The Aperture Diameter of the front surface is 50.0000 mm.
The Aperture Diameter of the back surface is 50.0000 mm.
Distance 22 between the back of field flattening lens 16 and the film 28 in camera 34 is 225.55 mm.
The Index of Refraction is 1.489 at 656.5 nm, 1.491 at 589.3 nm and 1.497 at 486.1 nm.

Note:
Positive radius indicates the center of curvature is to the right. Negative radius indicates the center of curvature is to the left.

The preferred embodiment has a 300 mm focal length, a focal ratio of F/6, a clear aperture of 50 mm and has a resolution of 185 line pairs/mm.

Figure 4:
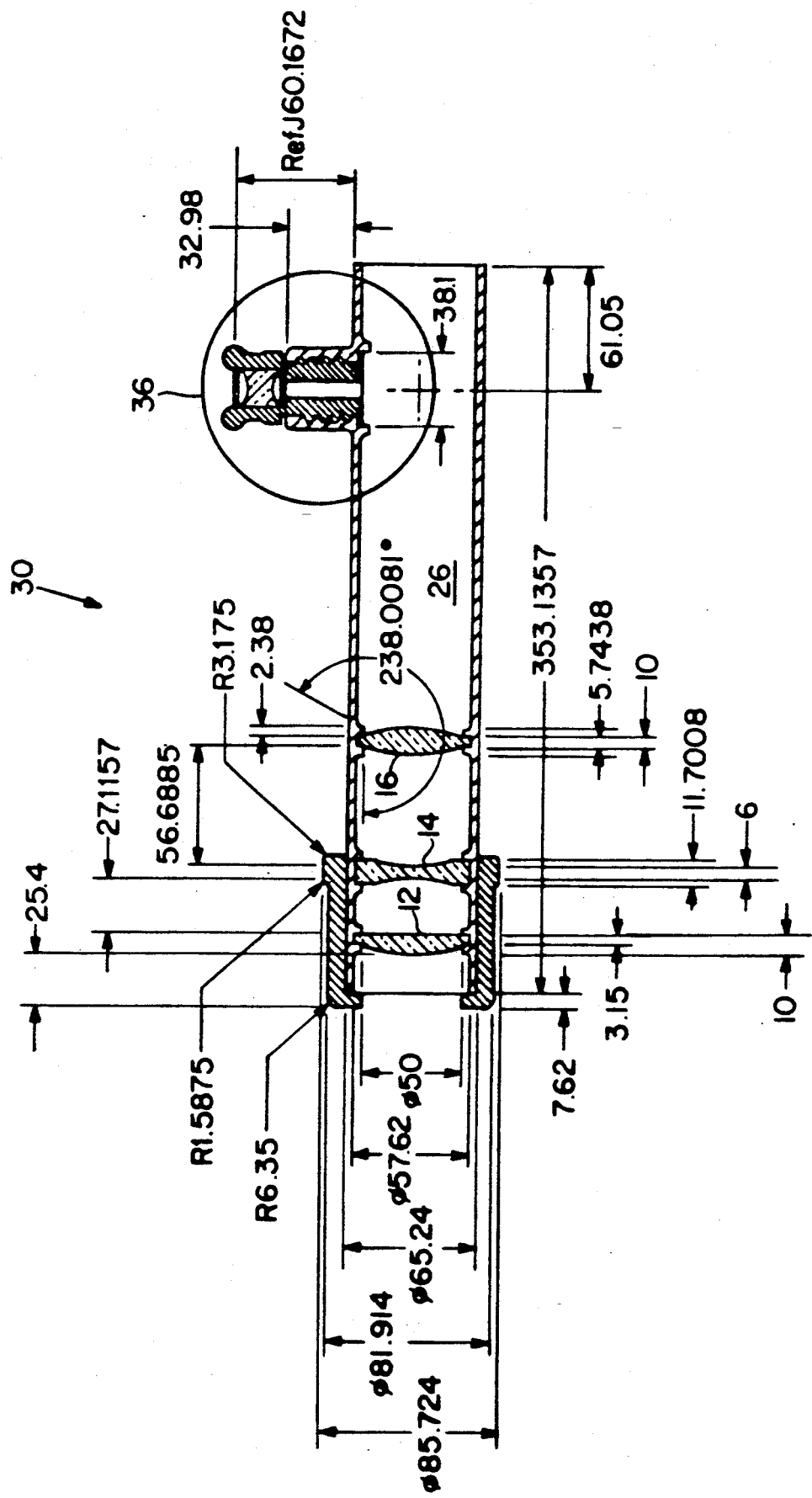
FIG. 4 shows a longitudinal cross-section of a preferred embodiment of the telescopic camera of the present invention showing the preferred lens prescription of the present invention.
Figure 5:
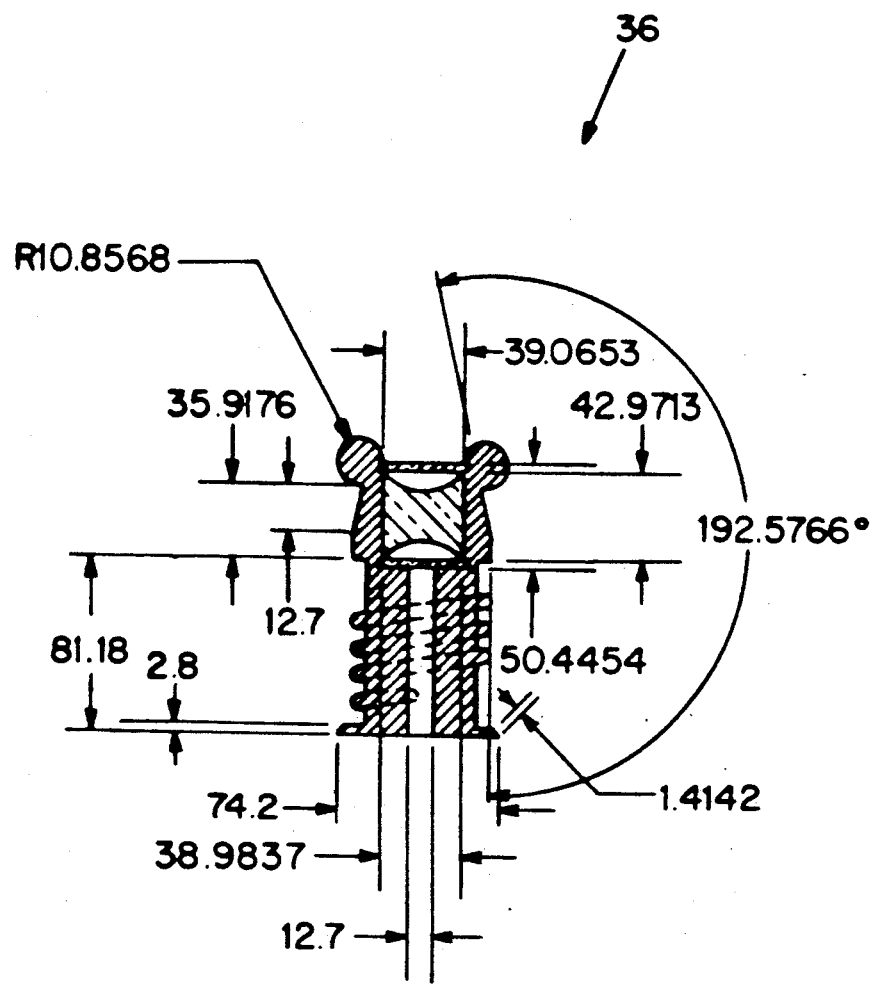
FIG. 5 shows the preferred embodiment of the dioptic eyepiece of the present invention.

The above-described lens prescription is shown schematically in FIG. 4.

An example of a standard equation to arrive at the sagitta (SAG) of a spherical or cylindrical surface is:

$$SAG = R - \sqrt{R^2 - (d/2)^2}$$

Where:
R = Radius
d = Diameter

An Example of a Standard Equation to arrive at the Sagitta (SAG) of a corrected sphere (Asphere) is:

$$Z = \frac{C \cdot Y^2}{1 + \sqrt{1 - (K+1) \cdot C^2 \cdot Y^2}} + A_2 \cdot Y^2 + A_4 \cdot Y^4 + A_6 \cdot Y^6 \ldots + A_{14} \cdot Y^{14}$$

Where:
Z = Axis parallel to Optical Axis (SAG)
C = 1/Radius of Curvature
K = −Z•e Where e is the Eccentricity of the conic surface. The Nature of the conic surface is dependent upon the value of K.
K < −1 Hyperloid.
K = −1 Paraboloid.
K > −1 Ellipsoid.
K = 0 Sphere.
Y = Y axis value distance out.
A = Best fit in the calculation.

Reference is made to the following two books the teachings of which are hereby incorporated by reference. *Modern Optical Engineering*, by Warren J. Smith (McGraw-Hill 1966) and *Elements of Modern Optical Design*, by Donald C. O'Shea (John Wiley 1985).

While it will be apparent that the preferred embodiment is well calculated to fill the above stated objects, it will also be appreciated that the present invention is susceptible to modification, variation, alteration, and change without varying from the proper scope and fair meaning of the following claims.

I claim:

1. A lens system for a telescopic camera comprising:
a primary lens, said primary lens being positive lens having a convex front surface and an aspheric back surface, said primary lens defining an optical axis;
a secondary lens, said secondary lens being a negative lens having a concave front surface and a concave back, the front surface of said secondary lens being positioned at a predetermined fixed distance adjacent to the back surface of the primary lens and centered with respect to the optical axis; and
a tertiary lens, said tertiary lens being a field flattening lens having a convex front surface and a convex back surface, the front surface of said tertiary lens being positioned at a predetermined fixed distance adjacent to the back surface of the secondary lens, wherein the primary, secondary and tertiary lenses have surfaces shaped to focus on an object viewed such that a field of view of about 4.2° is produced, and said lens system is capable of capturing approximately 94% of all incident photons within the optical axis.

2. A lens system as recited in claim 1, wherein the primary lens has:
a radius of curvature of the front surface of about 56.5695 mm convex,
a center thickness of about 10 mm,
a thickness at the periphery of about 3.15 mm,
an aperture diameter of the front surface of about 50.0000 mm,
an aperture diameter of the back surface of about 48.8705 mm,
a distance between the back of primary lens and the front of secondary lens of about 27.1157 mm, and
an index of refraction of the primary lens of about 1.489 at 656.5 nm, 1.491 at 589.3 nm and 1.497 at 486.1 nm.

3. A lens system as recited in claim 1, wherein the primary lens has:
a radius of curvature of the front surface of about 56.5695 mm convex,
a center thickness of about 10 mm,
a thickness at the periphery of about 3.15 mm,
an aperture diameter of the front surface of about 50.0000 mm,
an aperture diameter of the back surface of about 48.8705 mm,
an index of refraction of 1.489 at 656.5 nm, 1.491 at 589.3 nm and 1.497 at 486.1 nm, and
a distance between the back of primary lens and the front of secondary lens of about 27.1157 mm;
the secondary lens has:
a radius of curvature of the front surface of about −91.3488 mm concave,
a radius of curvature of the back surface of about 52.0513 mm concave,
a center thickness of about 6 mm,
a thickness at the periphery of about 11.70,
an aperture diameter of the front surface of about 38.3664 mm,
an aperture diameter of the back surface of 37.5159 mm,
an index of refraction of about 1.558 at 656.5 nm, 1.562 at 589.3 nm and 1.574 at 486.1 nm, and
a distance between the back of secondary lens and the front of field flattening lens 16 of about 56.6885 mm; and
the tertiary lens has:
a radius of curvature of the front surface of about 206.0846 mm convex,
a radius of curvature of the back surface of about −115.6613 mm convex,
a center thickness of about 10 mm,
a thickness at the periphery of about 2.38 mm,
an aperture diameter of the front surface of about 50.0000 mm,
an aperture diameter of the back surface of about 50.0000 mm, and
an index of refraction of about 1.489 at 656.5 nm, 1.491 at 589.3 nm and 1.497 at 486.1 nm, and
a predetermined distance between the back of field flattening lens; and a ray receiving surface of about 225.55 mm.

4. A lens system as recited in claim 1, wherein the secondary lens has:
a radius of curvature of the front surface of about −91.3488 mm concave,
a radius of curvature of the back surface of about 52.0513 mm concave,
a center thickness of about 6 mm,
a thickness at the periphery of about 11.70,
an aperture diameter of the front surface of about 38.3664 mm,
an aperture diameter of the back surface of 37.5159 mm,
an index of refraction of about 1.558 at 656.5 nm, 1.562 at 589.3 nm and 1.574 at 486.1 nm, and
a distance between the back of secondary lens and the front of field flattening lens 16 of about 56.6885 mm.

5. A lens system as recited in claim 1, wherein the tertiary lens has:
a radius of curvature of the front surface of about 206.0846 mm convex,
a radius of curvature of the back surface of about −115.6613 mm convex,
a center thickness of about 10 mm,
a thickness at the periphery of about 2.38 mm,
an aperture diameter of the front surface of about 50.0000 mm,
an aperture diameter of the back surface of about 50.0000 mm, and
an index of refraction of about 1.489 at 656.5 nm, 1.491 at 589.3 nm and 1.497 at 486.1 nm.; and
a distance between the back of field flattening lensand a ray receiving surface of about 225.55 mm.

6. A telescopic camera comprised of:
an annular tube having a front end and a back end: a primary lens permanently fixed within the front end of the tube, said primary lens being a positive lens having a convex front surface and an aspheric back surface, said primary lens defining an optical axis (20);
a secondary lens, said secondary lens being a negative lens having a concave front surface and a concave back, the front surface of said secondary lens being positioned within the tube at a predetermined fixed distance adjacent to the back surface of the primary lens and centered with respect to the optical axis; and a tertiary lens, said tertiary lens being a field flattening lens having a convex front surface and a convex back surface, the front surface of said tertiary lens being positioned at a predetermined fixed distance adjacent to the back surface of the secondary lens and being centered with respect to the optical axis; and a camera having a front opening being attached to the back end of the annular tube, said camera containing film which is centered with respect to optical axis such that the film is positioned at a predetermined fixed distance adjacent to the back surface of the tertiary lens, wherein the primary, secondary and tertiary lenses have surfaces shaped to focus on an object viewed such that a field of view of about 4.2° is produced, and said lens system is capable of capturing approximately 94% of all incident photons within the optical axis producing an image on the film in which all aspects of the image are in focus.

7. A telescopic camera as recited in claim 6, wherein the primary lens has:
a radius of curvature of the front surface of about 56.5695 mm convex,
a center thickness of about 10 mm,
a thickness at the periphery of about 3.15 mm,
an aperture diameter of the front surface of about 50.0000 mm,
an aperture diameter of the back surface of about 48.8705 mm,
a distance between the back of the primary lens and the front of the secondary lens of about 27.1157 mm, and
an index of refraction of the primary lens of about 1.489 at 656.5 nm, 1.491 at 589.3 nm and 1.497 at 486.1 nm.

8. A telescopic camera as recited in claim 6, wherein the primary lens has:
a radius of curvature of the front surface of about 56.5695 mm convex,
a center thickness of about 10 mm,
a thickness at the periphery of about 3.15 mm,
an aperture diameter of the front surface of about 50.0000 mm,
an aperture diameter of the back surface of about 48.8705 mm,
an index of refraction of about 1.489 at 656.5 nm, 1.491 at 589.3 nm and 1.497 at 486.1 nm, and
a distance between the back of the primary lens and the front of secondary lens of about 27.1157 mm;
the secondary lens has:
a radius of curvature of the front surface of about −91.3488 mm concave,
a radius of curvature of the back surface of about 52.0513 mm concave,
a center thickness of about 6 mm,
a thickness at the periphery of about 11.70,
an aperture diameter of the front surface of about 38.3664 mm,
an aperture diameter of the back surface of about 37.5159 mm,
an index of refraction of about 1.558 at 656.5 nm, 1.562 at 589.3 nm and 1.574 at 486.1 nm, and
a distance between the back of secondary lens and the front of field flattening lens of about 56.6885 mm; and
the tertiary lens has:
a radius of curvature of the front surface of about 206.0846 mm convex,
a radius of curvature of the back surface of about −115.6613 mm convex,
a center thickness of about 10 mm,
a thickness at the periphery of about 2.38 mm,
an aperture diameter of the front surface of about 50.0000 mm,
an aperture diameter of the back surface of about 50.0000 mm, and
an index of refraction of about 1.489 at 656.5 nm, 1.491 at 589.3 nm and 1.497 at 486.1 nm, and
a distance between the back of field flattening lens and a the film of about 225.55 mm.

9. A telescopic camera as recited in claim 6, wherein the secondary lens has:
a radius of curvature of the front surface of about −91.3488 mm concave,
a radius of curvature of the back surface of about 52.0513 mm concave,
a center thickness of about 6 mm,
a thickness at the periphery of about 11.70,
an aperture diameter of the front surface of about 38.3664 mm,
an aperture diameter of the back surface of 37.5159 mm,
an index of refraction of about 1.558 at 656.5 nm, 1.562 at 589.3 nm and 1.574 at 486.1 nm, and
a distance between the back of secondary lens and the front of field flattening lens 16 of about 56.6885 mm.

10. A telescopic camera as recited in claim 6, wherein the tertiary lens has:
a radius of curvature of the front surface of about 206.0846 mm convex,
a radius of curvature of the back surface of about −115.6613 mm convex,
a center thickness of about 10 mm,
a thickness at the periphery of about 2.38 mm,
an aperture diameter of the front surface of about 50.0000 mm,
an aperture diameter of the back surface of about 50.0000 mm, and
an index of refraction of about 1.489 at 656.5 nm, 1.491 at 589.3 nm and 1.497 at 486.1 nm, and
a distance between the back of field flattening lens 16 and a ray receiving surface of about 225.55 mm.

* * * * *